United States Patent

[11] 3,585,589

[72] Inventor John J. Reilly
Orinda, Calif.
[21] Appl. No. 674,619
[22] Filed Oct. 11, 1967
[45] Patented June 15, 1971
[73] Assignee Binary Systems, Inc.
Orinda, Calif.

[54] NUMERIC FONT AND APPARATUS FOR READING SAME
2 Claims, 3 Drawing Figs.

[52] U.S. Cl. ........................................ 340/146.3Z
[51] Int. Cl. ........................................ G06k 9/10
[50] Field of Search ........................................ 340/146.3
A, 174.1; 235/61.115, 61.114, 61.71; 283/1, 58

[56] References Cited

UNITED STATES PATENTS

| | | | |
|---|---|---|---|
| 2,963,220 | 12/1960 | Kosten et al. | 340/146.3 |
| 3,104,381 | 9/1963 | Gottschalk et al. | 340/146.3 |
| 3,112,469 | 11/1963 | Milford | 340/146.3 |
| 3,245,037 | 4/1966 | Brust et al. | 340/146.3 |
| 3,303,469 | 2/1967 | Pergotto | 340/146.3 |
| 2,952,008 | 9/1960 | Mitchell et al. | 235/61.71 |

*Primary Examiner*—Maynard R. Wilbur
*Assistant Examiner*—William W. Cochran
*Attorney*—Townsend & Townsend

ABSTRACT: A font of numerals that are of block form so as to be readily readable visually and electrooptically. Apparatus for reading the numerals by optically scanning the numerals at two vertically spaced points. Apparatus for converting the optical scan information to binary coded decimal form by processing the information at two time-spaced intervals.

JOHN J. REILLY, JR.
INVENTOR.

BY Townsend and Townsend
ATTORNEYS

NUMERIC FONT AND APPARATUS FOR READING SAME

This invention relates to a font of visually sensible Arabic numerals that can be read by an uncomplicated machine. The present invention also relates to a machine for optically sensing Arabic numerals and generating a binary coded signal corresponding to the number sensed.

In accordance with the present invention, information present in a set of standardized Arabic numerals is utilized most efficiently in order that a relatively uncomplex apparatus suffices to effect conversion of the decimal numerals to binary coded numerals.

For achieving its objects the present invention provides a set of numerals that contain information essential for machine sensing in only the vertical portions of the line segments that form the numerals. Accordingly, the numerals can be sensed by apparatus that includes an optical reader that sweeps along a path transverse of the vertical portions. The mechanical structure for effecting relative movement between the numerals and the optical reader can thus be of extremely simple nature. In order that the numerals be visually sensible, horizontal lines span the vertical lines at appropriate locations.

An object of the invention is to provide a font of numerals that can be quickly and accurately perceived. This object is achieved by providing numbers that, although they are formed of straight lines, are arranged to resemble Arabic numerals employed in ordinary printing.

Another object of the invention is to provide apparatus that employs a minimum number of elements in optically sensing a decimal numeral and converting it to a binary code. A characteristic of the present invention that contributes to achievement of this object is the inclusion of means for sensing the decimal numeral at two points that are spaced from one another in the time domain so that binary elements, such as flip-flops, can serve plural functions. Because typical flip-flops operate in the megacycle range and because the optical scan is relatively slow, time adequate for necessary switching is available between successive optical scans.

These and other objects and advantages will be more apparent after referring to the following specification and accompanying drawings in which.

Figure 1:
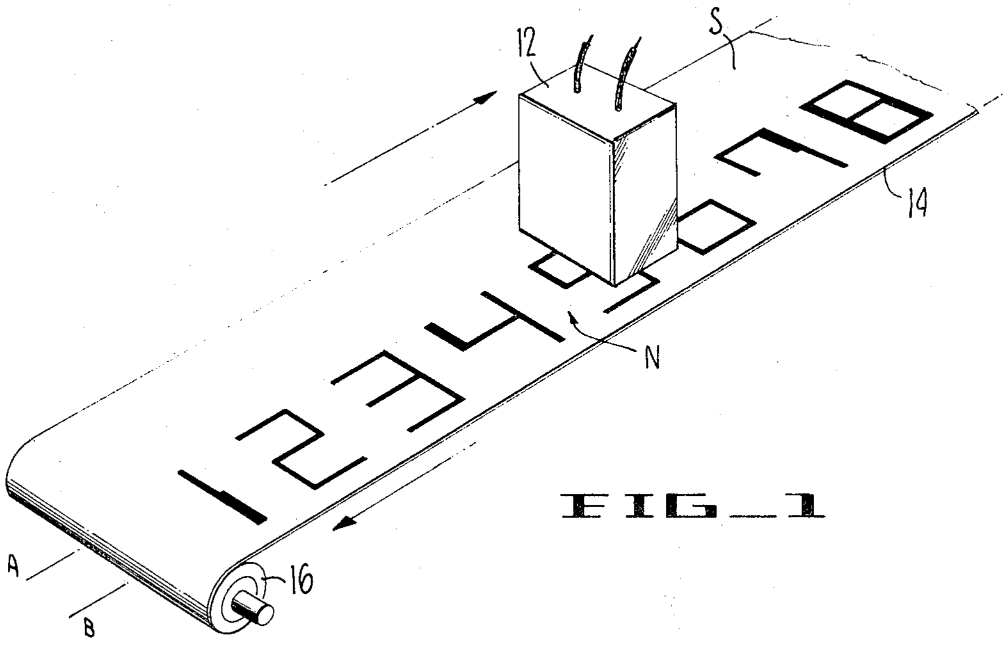
FIG. 1 is a perspective view of the apparatus of the present invention in scanning position with respect to several exemplary numerals of the present invention.

Referring more particularly to the drawings, reference numeral 12 indicates an optical reading head shown in overlying relation to a sheet S on which are printed numerals according to the present invention. Relative movement between sheet S and head 12 is effected by any suitable expedient, such as a conveyor belt 14 that is supported on suitable drive means including a roller 16.

Scanning head 12 is adapted to detect optically two spaced apart points, which points are defined in the embodiment shown in the drawings by beams from a light source 18 and from a light source 20. Associated with the light sources are photodetectors 22 and 24, respectively; the output of photodetector 24 is indicated as B.

For understanding more clearly the logic to which outputs A and B are connected, the general layout of the Arabic numerals according to the present invention will be explained. It can be seen from FIG. 2 that each numeral, except "1" and "3," has lines residing in two spaced apart regions. For example, it will be seen that the numeral "2" has a segment 26 in a first region toward the left in FIG. 2. The numeral 28 in a second region toward the right in FIG. 2. The numeral "4" includes a line segment 30 leftwardly thereof, and rightwardly thereof an upper line segment 32 and a lower line segment 34 in alignment with segment 32. It will be noted that segment 30 has a thickness that is large with respect to the thickness of lines 32 and 34. Such difference in width is exploited by apparatus described hereinbelow for distinguishing the numerals.

The numeral "5" includes an upper left line segment 36 and a lower right line segment 38. The numeral "6" includes an upper left segment of relatively large width and a lower left segment 42 of relatively narrow width. The numeral "6" also includes a right-hand line segment 44. Numeral "7" includes an upper left segment 46, an upper right segment 48 and a lower right segment 50. Segment 48 is relatively wide compared with the other line segments. Numeral "8" includes an upper left segment 52 and a lower left segment 54 which are both of relatively wide width. At the right the numeral "8" includes an upper segment 56 and a lower segment 58, the segment 58 being of relatively wide width and the segment 56 being relatively narrow.

Numeral "9" has an upper left line segment 60 and an upper right line segment 62, both of which are relatively narrow. The numeral also has a lower right line segment 64 that has a relatively wide width. Numeral "0" has an upper left segment 66 of wide width and a lower left segment 68 of wide width. At the right side of numeral "0" there is an upper wide segment 70 and a lower wide segment 72. As can be seen, each of the numerals has a unique arrangement of line segments. Accordingly, the numerals are machine readable by an optical structure that senses the presence or absence of a line as well as the thickness of lines that are present.

Numeral "1" and numeral "3" are special cases in that each has line segments in only one position. Numeral "1" has an upper narrow line segment 74 and a lower line segment 76; numeral "3" has an upper narrow segment 78 and a lower narrow segment 80.

Figure 2:
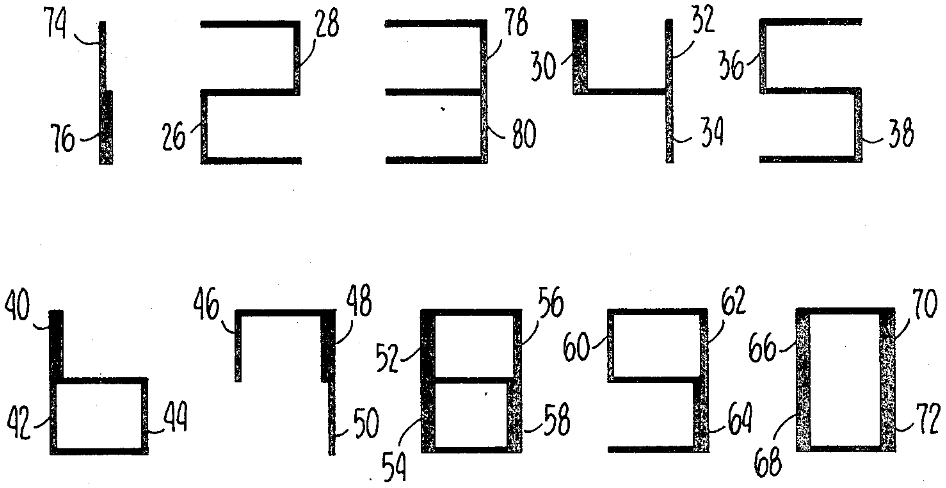
FIG. 2 is a font of Arabic numerals according to the present invention.

FIG. 2 demonstrates that the numerals according to the present invention are convenient for the human reader and that the numerals are uniform in their width and spacing. Additionally, the numerals are readable by a machine of uncomplicated construction and design.

Figure 3:
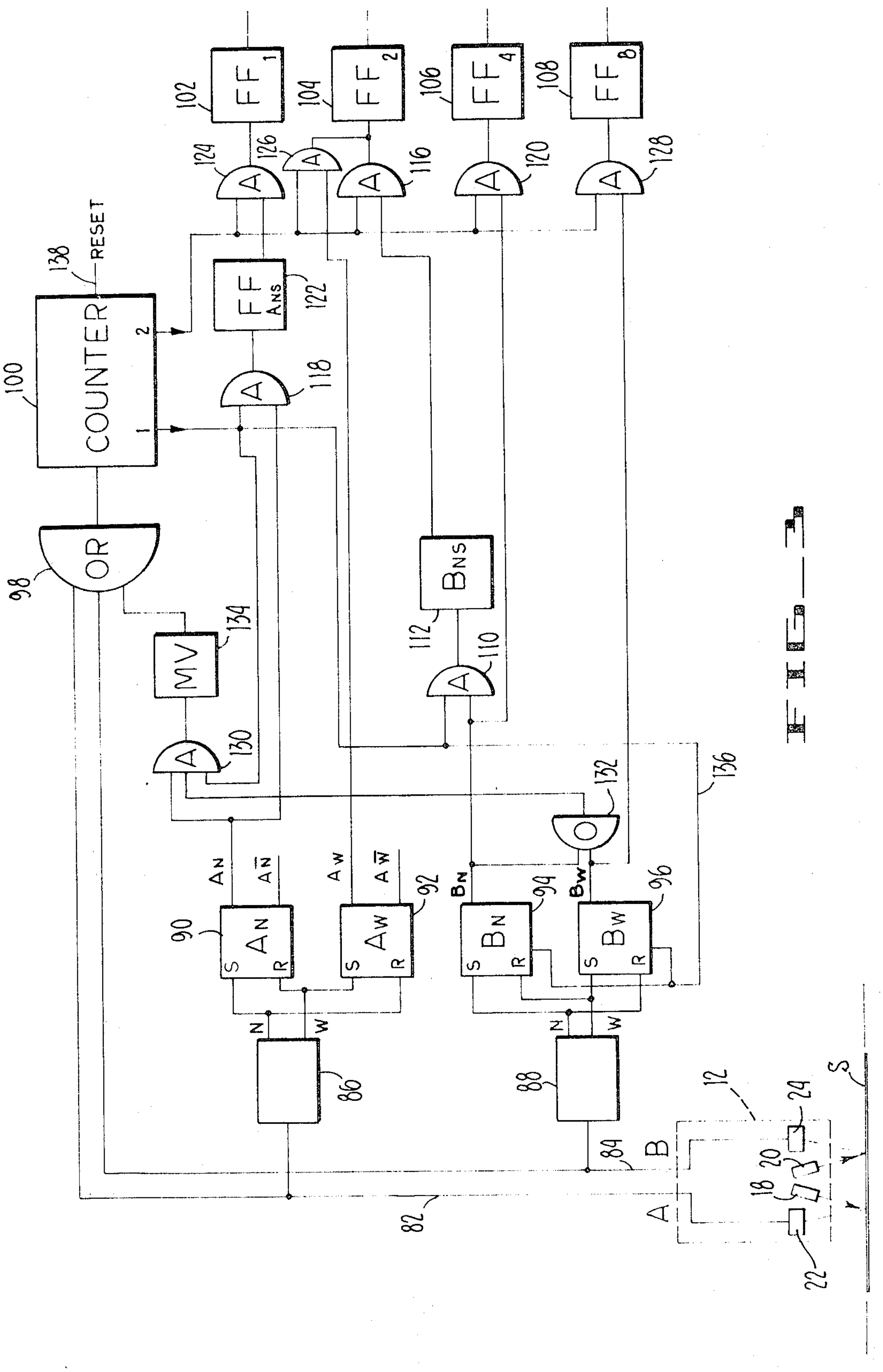
FIG. 3 is a block diagram of the converting apparatus of this invention.

The machine or converter of the present invention, as shown in block form in FIG. 3, includes an input terminal 82 from optical sensor 22, and an input terminal 84 from optical sensor 24. Inputs 82 and 84 are connected to electronic width discriminators 86 and 88, respectively, which have output terminals indicated as N, which is excited when photodetector 22 senses a narrow line, and output W, which is energized when the photodetectors sense wide lines.

A flip-flop 90 is associated with discriminator 86 and is set each time the "N" output of the discriminator is excited. A flip-flop 92 is associated with the "W" output of discriminator 86 and is set when the latter output is excited. Flip-flops 90 and 92 have reset terminals that are connected to opposite outputs of discriminator 86 so that only one or the other, but not both, flip-flops is set at a given time.

Associated with discriminator 88 in an identical manner are flip-flops 94 and 96. Input connections 82 and 84, in addition to being connected to the discriminators as described above, are connected to an OR gate 98 which triggers a counter 100 so that each time any vertical line segment is sensed, a count will be registered in counter 100. Counter 100 has three states, which for conveniences of description can be referred to as a zero state, a one state and a two state. The counter is in the zero state intermediate the sensing of two adjacent numerals; the counter is in the one state after it has sensed the first or left-hand vertical segment of a number; the counter is in the two state when it has sensed the second or right-hand vertical segment, and before it has been reset to the zero state.

The binary output of the present system is formed by four flip-flops: a flip-flop 102 that designates a decimal 1, a flip-flop 104 that designates a decimal 2, a flip-flop 106 that designates a decimal 4, and a flip-flop 108 that designates a decimal 8.

Because numerals "1" and "3" constitute special cases, the explanation of the apparatus of FIG. 3 in converting such numbers to binary code will be deferred. In order to sense a decimal "2" and convert it to binary code, it is necessary to set flip-flop 104. As the numeral "2" is moved with respect to pickup head 12, line segment 26 is sensed by photodetector 24, and flip-flop 94 is set through the action of discriminator 88 because line segment 26 is relatively narrow. The output of flip-flop 94 is connected to one input terminal of an AND gate 110. Connected to the other input of AND gate 110 is the output of counter 100 that corresponds with the one count. An auxiliary flip-flop 112, connected to the output of AND gate 110, is thus set when counter 100 is switched to the one state. The output of flip-flop 112 is connected to one input of an AND gate 116. As the right-hand side of numeral "2" is scanned, input 82 is excited so as to cause another count in counter 100 and switch the counter to the two state. Accordingly, at time two AND gate 116 couples the signal through to flip-flop 104 so that the flip-flop is set. A decimal "2" output is thus achieved. The presence of line segment 28 has no effect on the output flip-flop because an AND gate 118 to which the output of flip-flop 90 is connected is not turned on during count two.

Numeral "4" is read in the following manner: line segment 30 is sensed by photodetector 22, and with the cooperation of discriminator 86, flip-flop 92 is set; such action prevents storage of a signal in flip-flop 122 during time one. During the second count segment 34 is sensed by photodetector 24 and flip-flop 94 will be set. The output of this flip-flop is connected to an AND gate 120 which triggers flip-flop 106. Accordingly, at time two, flip-flop 106 is set and the desired decimal output, 4, is achieved.

For securing a binary output of "5" it is necessary to set flip-flops 106 and 102 at time two. Line segment 36 which is sensed at time one by photodetector 22 sets flip-flop 90 and sets a second auxiliary flip-flop 122 which is connected to the output of AND gate 118. Setting of flip-flop 122 opens an AND gate 124 so as to prepare flip-flop 102 to be set at time two. Line segment 38 excites photodetector 24 and sets flip-flop 94. Thereby, AND gate 120 is opened so that when output two of counter 100 is energized, flip-flops 106 and 102 are set. Accordingly, a binary "5" is produced.

For converting the numeral "6" to binary code, the apparatus of FIG. 3 operates as follows: because upper line segment 40 is wide, flip-flop 92 is set, and because line segment 42 is narrow, flip-flop 94 is set as the numeral is scanned by reading head 12. As can be seen from the figure, the setting of flip-flop 94 opens AND gate 110 so that at time one flip-flop 112 is set. The setting of flip-flop 112 opens AND gate 116. During the second time interval, i.e., at the time the right-hand side of the numeral is scanned, line segment 44 sets flip-flop 94, which opens gate 120. Accordingly, at time two, gates 116 and 120 are opened. When the second timing pulse from counter 100 occurs, it is conducted through gate 116 to set flip-flop 104 (decimal 2) and is conducted through gate 120 to set flip-flop 106 (decimal 4).

In order to convert the numeral "7" to binary code, line segment 46 is sensed and flip-flop 90 is set. Setting of flip-flop 90 opens AND gate 118 so that at time one, counter 100 feeds a timing pulse through gate 118 to set flip-flop 122. Setting of flip-flop 122 opens gate 124 to the succeeding counter pulse at time two. The optical sweep to photodetector 22 subsequently senses line segment 48, which sets flip-flop 92, which opens an AND gate 126 that is coupled to the input of flip-flop 104. Detection of narrow line segment 50 by photodetector 20 and width discriminator 88 sets flip-flop 94 which in turns opens gate 120. Accordingly, at time two, flip-flop 102 is set through gate 124, flip-flop 104 is set through gate 126, and flip-flop 106 is set through AND gate 120. Consequently, at time two the decimal "7" output at flip-flops 102, 104, and 106 is achieved.

In sensing the numeral "8, " flip-flops 92 and 96 are set by photodetection of line segments 52 and 54, respectively. At time one the setting of these flip-flops has no consequence. Subsequently, and in response to line segments 56 and 58, flip-flop 90 is set and flip-flop 96 is set. The setting of flip-flop 90 at time two has no effect, whereas the setting of flip-flop 96 opens a gate 128 so that at time two, flip-flop 108 is set and the requisite decimal "8" output is provided.

In reference to numeral "9, " line segment 60 sets flip-flop 90 so that at time one AND gate 118 permits setting of auxiliary flip-flop 122. Line segment 62 pulses the counter to time two so as to set flip-flop 102 through AND gate 124. Line segment 64 sets flip-flop 96 which opens AND gate 128 to set flip-flop 108. A decimal "9" output in binary coded form is thereby achieved.

The zero numeral is converted to binary code by the apparatus of FIG. 3, and this action is initiated when segment 66 sets flip-flop 92 and segment 68 sets flip-flop 96. At time one this has no effect on the auxiliary or output flip-flops. At the right side of the numeral, segment 70 permits flip-flop 92 to remain set so that AND gate 126 is open at time two. Accordingly, at time two flip-flop 104 is set. Relatively wide line segment 72 sets flip-flop 96 which opens gate 128 so that flip-flop 108 is also set at time two.

From the foregoing it will be seen that relatively simple gating circuits are sufficient to convert the numerals into standard binary code. The number of flip-flops necessary to achieve coding is substantially reduced because the flip-flops are used on a time-shared basis. The special cases for reading numerals "1" and "3" will be explained, and it will now be appreciated that these numerals are special cases because they have only one group of vertical line segments. From FIG. 2 it will be noted that numerals "1" and "3" have narrow line segments 74 and 78, respectively, in the upper portion thereof, and that both of the numerals have a line in the lower portion thereof, the numeral "1" having a wide segment 76 and the numeral "3" having a narrow segment 80. Numerals "1" and "3" are the only numerals that have a narrow segment in the upper portion thereof combined with a segment (either narrow or wide) in the lower portion thereof. This unique characteristic is exploited in reading and binary coding numerals "1" and "3" according to the present invention.

When segment 74 is sensed, flip-flop 90 is set and one of the three inputs of an AND gate 130 is energized. When segment 76 is sensed, flip-flop 96 is set so that another input of AND Agate 130 is energized through an OR gate 132. At time one a pulse from counter 100 energizes the remaining input to AND gate 130. The actuation of AND gate 130 triggers a monostable multivibrator 134 which effects a time delay so as to generate a count two. In other words, the initial sensing of segments 74 and 76 are conducted directly through OR gate 98 to counter 100 so as to form count one, and at a subsequent time determined by the parameters of multivibrator 134, a second pulse corresponding to time two is generated and fed through OR gate 98 to counter 100. At time one flip-flop 90 opens gate 118 so that flip-flop 122 is set. At time two, because gate 124 is opened by flip-flop 122, the second counter pulse is connected to flip-flop 102 to set that flip-flop and generate a decimal "1." Since flip-flop 96 is reset at time one by a connection 136, flip-flop 108 is not set.

Conversion of the numeral "3" to binary code is similar. Line segment 78 sets flip-flop 90 and line segment 80 sets flip-flop 94. As a consequence, AND gate 130 is energized so as to pulse multivibrator 134 at time one to generate a second timing pulse. During the first timing pulse, flip-flop 122 is set as explained above in connection with the numeral "1" and flip-flop 112 is set because gate 110 is opened by flip-flop 94. Flip-flop 112 opens gate 116. At time two gates 124 and 116 are opened so as to set output flip-flops 102 and 104. A decimal "3" is thus produced.

Counter 100 is provided with a reset line 138 which is connected to each and every flip-flop in the system as well as to counter 100. Reset line 138 is activated after pulse two permits readout of the binary coded decimal at the outputs of flip-flops 102, 104, 106, and 108. The reset line resets all circuit elements to ready the apparatus for detecting and converting a subsequent numeral.

It will thus be seen that the present invention provides a numeric font and apparatus for reading and converting the numerals in the font to binary code. The apparatus is extremely straight forward, uncomplicated and employs a minimal number of conventional logical circuit elements. Because the numerals are scanned at two channels that are spatially separated, and at two intervals that are temporarily separated, the number of elements necessary for nonredundant conversion is significantly reduced. Moreover, because only the vertical line segments forming the numbers are employed in the machine reading of the numerals, the horizontal portions of the numerals can be scaled to accord more with the reader's visual acuity.

Although one embodiment of the invention has been shown and described, it will be obvious that other adaptations and modifications can be made without departing from the true spirit and scope of the invention.

I claim:

1. A system for representing and automatically reading decimal numeric indicia comprising:

optically readable decimal symbols, each symbol comprising four stations in generally rectangular disposition, said stations consisting of a first upper left station, a second lower left station in vertical alignment with said first station, a third upper right station parallelly spaced from said first station, and a fourth lower right station parallelly spaced from said second station and in alignment with said third station, selected said stations having line segments therein to form vertical elements of decimal numerals, each said line segment being one of two preselected widths, and a horizontal line portion sites extending between the extremities of said line segments, there being a primary site extending between the upper extremities of said first and third stations, a secondary site extending between the lower extremities of said first and third stations, and ternary site extending between the lower extremities of said second and fourth stations, said symbols formed on a plane surface with lines that optically contrast with the surface;

and means for automatically reading said symbols comprising first and second sensors responsive to the contrasting vertical line segments, said first sensor arranged for reading vertical line segments in the first and third stations of a decimal symbol, said second sensor arranged for reading vertical line segments in the second and fourth stations of a decimal symbol, means for effecting relative movement between said surface and said sensors, means responsive to the output of said sensors for generating timing pulses, means responsive to the output of said sensors to detect the duration of excitation of said sensors so as to distinguish between vertical line segments of said two preselected widths, means for storing information as to the existence and width of lines during said timing pulses, and logic circuit means operative during said time pulses for processing the output of said sensors and said information storing means for generating a binary coded decimal number corresponding to the decimal symbols.

2. A system for representing and automatically reading decimal numeric indicia as set forth in claim 1 wherein said first and second sensors comprise optical sensors.